(12) United States Patent
Rastegar et al.

(10) Patent No.: US 7,907,669 B2
(45) Date of Patent: Mar. 15, 2011

(54) LOW-DETECTABILITY COMMUNICATION BETWEEN A TRANSMITTER AND RECEIVER

(75) Inventors: Jahangir S. Rastegar, Stony Brook, NY (US); Thomas Spinelli, East Northport, NY (US)

(73) Assignee: Omnitek Partners, LLC, Ronkonkoma, NY (US)

( * ) Notice: Subject to any disclaimer, the term of this patent is extended or adjusted under 35 U.S.C. 154(b) by 1283 days.

(21) Appl. No.: 10/633,846

(22) Filed: Aug. 4, 2003

(65) Prior Publication Data

US 2004/0091054 A1    May 13, 2004

Related U.S. Application Data

(60) Provisional application No. 60/400,715, filed on Aug. 2, 2002.

(51) Int. Cl.
*H04L 27/00* (2006.01)

(52) U.S. Cl. ......... 375/259; 375/219; 375/222; 375/295; 375/316

(58) Field of Classification Search .......... 375/222, 375/259, 367, 219, 295, 316
See application file for complete search history.

(56) References Cited

U.S. PATENT DOCUMENTS

| | | | |
|---|---|---|---|
| 6,192,070 B1 * | 2/2001 | Poon et al. | 375/222 |
| 6,198,764 B1 * | 3/2001 | Schuermann et al. | 375/130 |
| 6,947,490 B1 * | 9/2005 | Edwards et al. | 375/261 |

* cited by examiner

*Primary Examiner* — Ted M Wang (57) ABSTRACT

A method for low-detectability communication between a transmitter and receiver is provided. The method including: transmitting first data from the transmitter according to at least one of a first timing, modulation, and frequency; appending the first data, prior to transmission, with information regarding at least one of a second timing, modulation, and frequency for a subsequent transmission; and transmitting second data from the transmitter according to the information.

15 Claims, 6 Drawing Sheets

LOW-DETECTABILITY COMMUNICATION BETWEEN A TRANSMITTER AND RECEIVER

CROSS-REFERENCE TO RELATED APPLICATION

This application claims benefit to earlier filed U.S. provisional application Ser. No. 60/400,715 on Aug. 2, 2002.

BACKGROUND OF THE INVENTION

1. Field of the Invention

The present invention relates generally to low-detectability transmission between a transmitter and a receiver, and more particularly, to a low-detectability sensor communication.

2. Prior Art

There are many situations where it is desired to insert a surveillance sensor in a location which is inaccessible to the user after deployment, and in which it is necessary to conceal the presence of the sensor from those under surveillance, the most obvious example being sensors located in enemy territory. Since the sensor is inaccessible, the sensor must transmit some form of wireless electronic communication for the data to be recovered. This however, requires that the sensor be capable of emitting electromagnetic energy, with the result that the sensor may be detected by those under surveillance, and destroyed.

There is therefore a conflict between the requirement for data recovery, and the requirement that the sensor be "stealthy". It is important to note that the stealth requirement is quite different from the security of the data transmitted by the sensor. The issue here is not the sensor data security (for which encryption is the appropriate tool), but about the detectability of the sensor itself. However, as will be discussed below, encryption can be important in the methods of the present invention, if not for different reasons.

The fundamental problem is that the emissions from the sensor will, if directional antennas and triangulation are used by opponents, eventually enable the sensor to be located and destroyed. Several possible solutions have been proposed for this problem, all of which have drawbacks. These can be summarized as two approaches to "hiding" the sensor emissions in three domains: the three domains are time, space, and frequency (including modulation key), and the two approaches are either to concentrate the energy in the domain, possibly with pseudo-random changes in the location, or to spread it over the domain so that its intensity at any point is low enough to escape detection.

As an example of this, the normal spatial mode of communication is omnidirectional; but if the sensor concentrates its radiation vertically upwards it is unlikely to be picked up by opponents. The disadvantage is that a receiver must remain on station to receive the data. This can make it relatively easy to locate and destroy, which has the same end effect as the destruction of the sensor. In this case, pseudo-random changes in the direction are probably not practical in terms of receiver location and costs.

The choice between diversity and concentration in the other two domains (time and frequency/modulation) is much more complex, with numerous approaches having been proposed; for example, sensing the local noise environment, and transmitting in regions of the frequency spectrum where the ambient noise is low, at an intensity which brings the total spectral density in the low-noise regions just up to the average noise level, in effect "whitening" the noise as seen by the opponent. A disadvantage of this, which is addressed by the proposed method, is that the noise spectrum seen by the receiver is likely not to be the same as that seen by the transmitter, and so the receiver would not know what frequency band to demodulate.

SUMMARY OF THE INVENTION

Therefore it is an object of the present invention to provide a sensor and other transmitter communication that overcomes the disadvantages of conventional ultrasonic instrumentation known in the art.

Accordingly, a method for low-detectability communication between a transmitter and receiver is provided. The method comprising: (a) transmitting first data from the transmitter according to at least one of a first timing, modulation, and frequency; (b) appending the first data, prior to transmission, with information regarding at least one of a second timing, modulation, and frequency for a subsequent transmission; and (c) transmitting second data from the transmitter according to the information.

The information can comprise a change in at least one of the first timing, modulation, and frequency. The change can comprises random generation of the at least one of the first timing, modulation, and frequency.

The information can comprise a deviation in at least one of the first timing, modulation, and frequency.

The information can comprise at least one of the second timing, modulation, and frequency.

The method can further comprise repeating steps (b) and (c) for subsequent data sets.

Also provided is a transmitter for low-detectability communication with a receiver. The transmitter comprising: means for transmitting first data according to at least one of a first timing, modulation, and frequency; means for appending the first data, prior to transmission, with information regarding at least one of a second timing, modulation, and frequency for a subsequent transmission; and means for transmitting second data from the transmitter according to the information.

Still provided is a receiver for receiving a low-detectabiity communication from a transmitter. The receiver comprising: means for receiving first data from the transmitter at least one of a first timing, modulation, and frequency, the first data containing information regarding at least one of a second timing, modulation, and frequency for a subsequent transmission; means for reading the information in the first data; and means for receiving the second data from the transmitter according to the information.

Still further provided is a system for low-detectability communication. The system comprising: a transmitter comprising: means for transmitting first data from the transmitter according to at least one of a first timing, modulation, and frequency; means for appending the first data, prior to transmission, with information regarding at least one of a second timing, modulation, and frequency for a subsequent transmission; and means for transmitting second data from the transmitter according to the information; and a receiver comprising: means for receiving the first data from the transmitter; means for reading the information in the first data; and means for receiving the second data from the transmitter according to the information.

Also provided are a computer program product for carrying out the methods of the present invention and a program storage device for the storage of the computer program product therein.

BRIEF DESCRIPTION OF THE DRAWINGS

These and other features, aspects, and advantages of the apparatus and methods of the present invention will become better understood with regard to the following description, appended claims, and accompanying drawings where:

FIG. 5 illustrates graphically a noisy signal, while

DETAILED DESCRIPTION OF THE PREFERRED EMBODIMENT

Although this invention is applicable to numerous and various types of transmitters/receivers, it has been found particularly useful in the environment of sensor communication. Therefore, without limiting the applicability of the invention to sensor communication, the invention will be described in such environment.

The proposed approach belongs the category which uses diversity in time and in frequency/modulation. The idea is to transmit for short times at pseudo-random intervals, as in other, previously studied approaches; however, it encodes information about the next transmission time and modulation in the current transmission, and, in its present form, it reduces the likelihood of detection by transmitting no power for one of its signal levels.

In more detail, we assume that the data are to be transmitted in a digital format consisting of several words, each of which has a number of binary digits. Initially, the transmission times, frequency bands, and modulation keys are assumed to be selected sequentially by an algorithm that is known to both the sensor (transmitter) and receiver. However, the transmitter can encode information into each word about changes in the timing, frequency, or modulation of the next word to be transmitted. This information can be changes in the parameters of a random process generating these variables, the deviation of the next values used from a fixed value, or the values of the variables themselves for the next transmission. The fact that the receiver knows the transmission times in advance implies that one of the bit values (usually zero) can be encoded as zero energy transmitted. This is normally bad practice in digital communications, but in this case it will reduce the average power transmitted, and thus the likelihood of detection, by a factor of two for a random binary message.

The other major advantages of the methods of the present invention are, first, that it can lower the detectability of the sensor to a significantly greater extent than previous approaches, since it can have far greater frequency, time, and modulation diversity. Second, the frequency band to which the next word will be shifted can be chosen on the basis of the "noise fill-in" method mentioned above, and this band can be encoded in the present transmission. This gives the receiver knowledge of the band in which the signal will be transmitted, thus solving one of the major problems of the noise fill-in method.

A simplified example of the above approach has been simulated to demonstrate its feasibility. In the example, no high-frequency modulation is performed, in order to save simulation time. Instead, the modulation frequency is chosen from two possibilities, DC and half of the sampling frequency (f_S/2). The message consists of three-bit words, and the modulation frequency is switched between the two values, depending on whether the parity of the previous word is even or odd. The receiver then switches its demodulation in accordance with the transmitted signal. The transmission instants are determined by a pseudo-random Poisson process, and the signal is encoded onto a fixed pseudo-random vector of length 10. In a preferred embodiment of the system, the encoded signal would be frequency-shifted into one of numerous high-frequency bands, and the modulation would be essentially code-division multiplexing (CDM). In an embodiment of the system, the transmission times and modulation keys would also be varied.

For the present example, however, simple switching of the modulation frequency of the transmission is used, as a demonstration of feasibility. The example is given a Simulink block diagram in FIG. 1 where the Poisson process is generated by the block labeled "Poisson" 10, and is connected to both transmitter 20 and receiver 30. In an embodiment of the system, an identical pseudo-random algorithm with the same seed would be used by both. The block labeled "modulator" is the transmitter 20; it reads the signal 40 as a vector of ones and zeros from the workspace, transmits one bit at each Poisson instant, and encodes the signal onto the known pseudo-random key. It also changes the modulation as dictated by the previous message.

Figure 1:
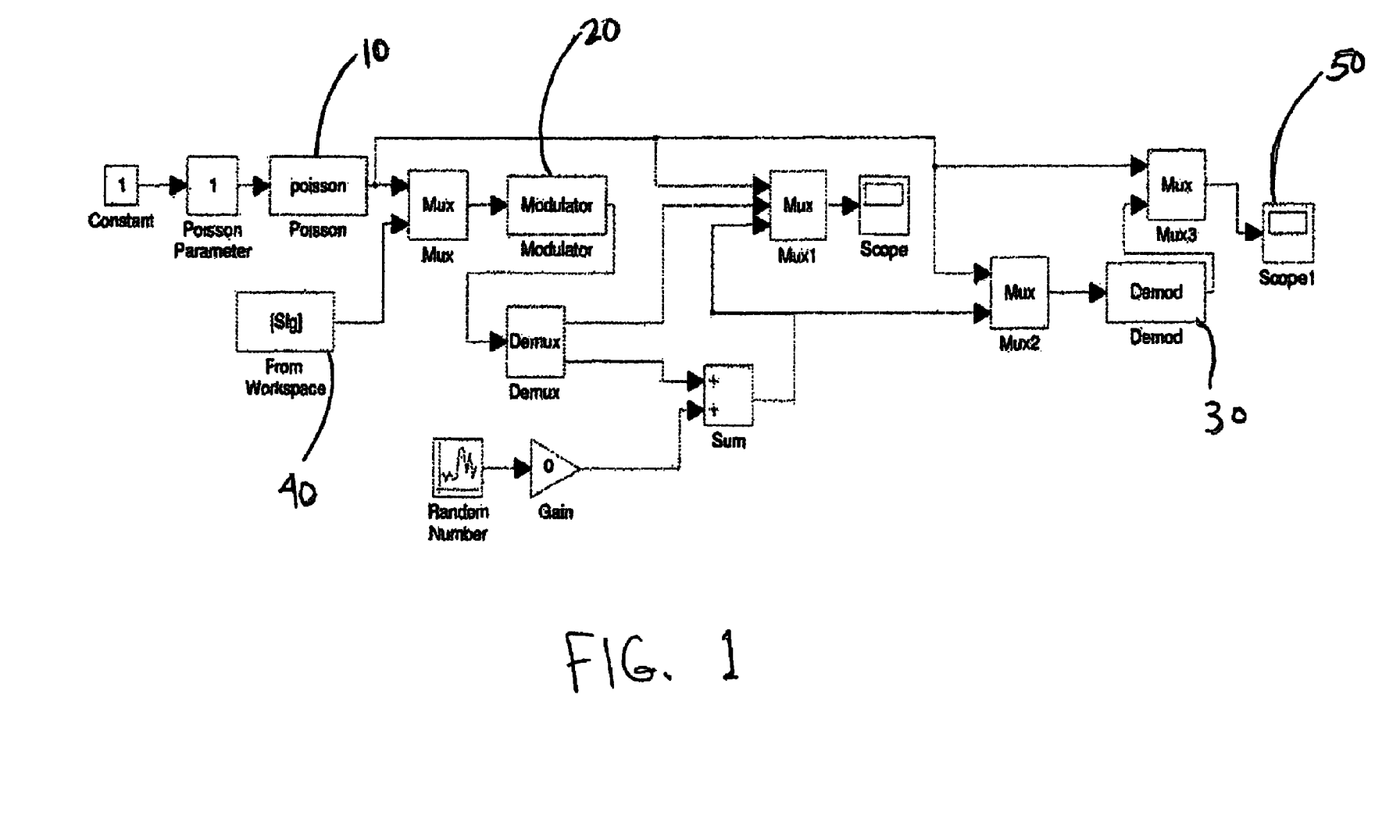
FIG. 1 illustrates a schematic of an embodiment of a system for carrying out the low-detectability communication methods of the present invention.

White Gaussian noise is then added to the signal, and it is transmitted to the receiver 30, labeled "demod", which demodulates the signal, and the result is displayed on an oscilloscope 50. The blocks labeled "Mux" and "Demux" have no significance in the simulation; they are required by Simulink to connect multiple inputs and outputs to a block.

Figure 2:
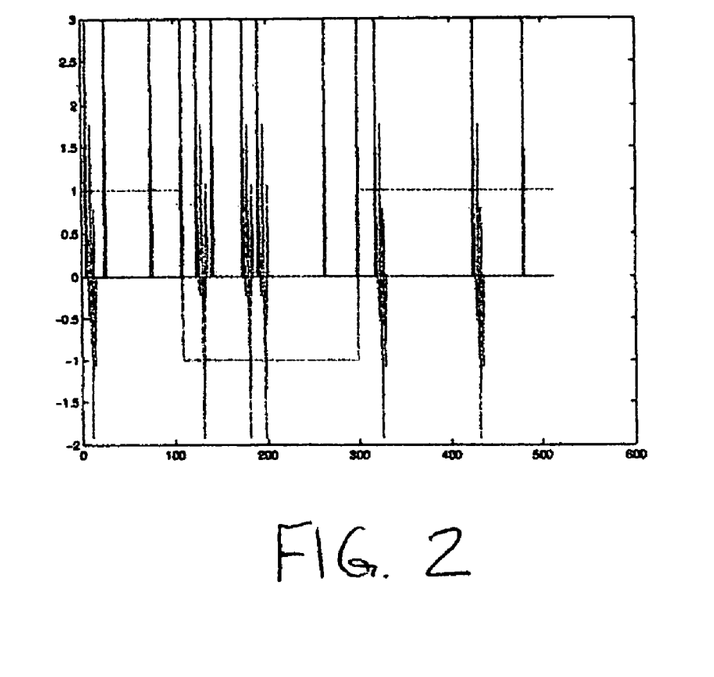
FIG. 2 illustrates graphically the Poisson instants and the transmitted signal from the system of FIG. 1.

The binary vector (1 0 0 0 1 0 1 1 0 0 1 1 0 0) was used as input for the following experiments. Initially, the simulation was run noise-free. FIG. 2 shows the Poisson instants and the transmitted signal. It also shows which modulation was used at each point: +1 for DC, and −1 for f_S /2. It should be noted that no energy is transmitted for a zero. Also, the transmitted wave-form changes shape as the modulation changes, and it can be verified that the modulation is following the parity of the 3-bit words. In the example, the Poisson parameter was picked to fit the signal onto a graph of reasonable size; another embodiment can have much greater average time-intervals between bit transmissions.

Figure 3:
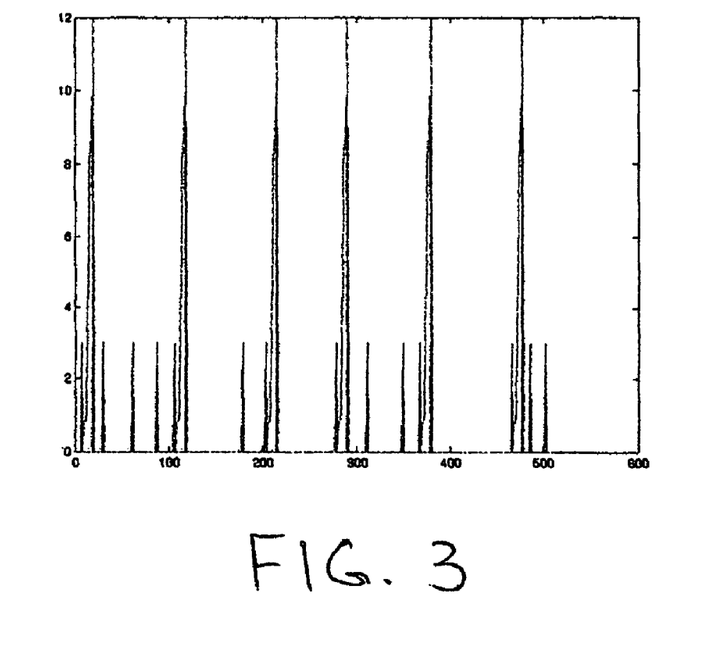
FIG. 3 illustrates graphically the output of the demodulator's response of the system of FIG. 1 to the received signal.
Figure 4:
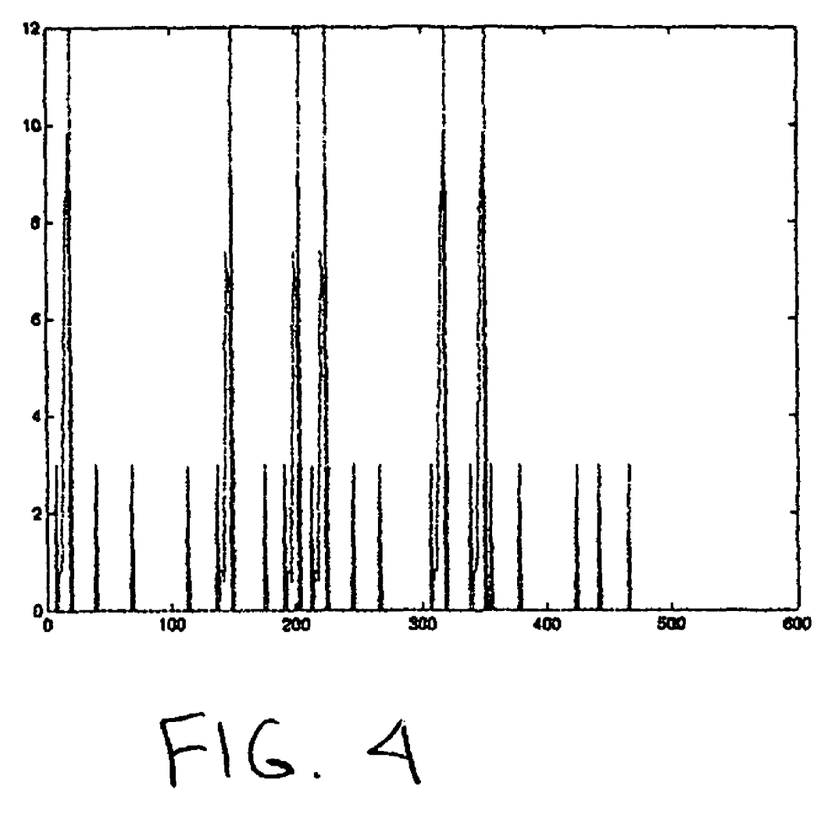
FIG. 4 illustrates graphically the results of a null test without using previous word information to change the demodulation.

FIG. 3 shows output of the receiver's 30 (demodulator's) response to the received signal. It displays the Poisson points again, together with the output of the correlator, and the final detected value (with binary one having value 12 for clarity). Note that the output of the correlator is identical for both kinds of modulation. As a null test, the receiver was run normally, that is, without using the previous word information to change the demodulation, and the results are shown in FIG. 4 for another run of the system, thus, the Poisson points are different than those shown above. While the two forms of modulation have high enough correlation for the detector to work, the correlator outputs are clearly different when the alternate modulation is used, and in particular, the correlator output is not monotonically increasing during the symbol period, and so is not matched to the received signal at these points. This verifies the operation of the system.

Figure 5:
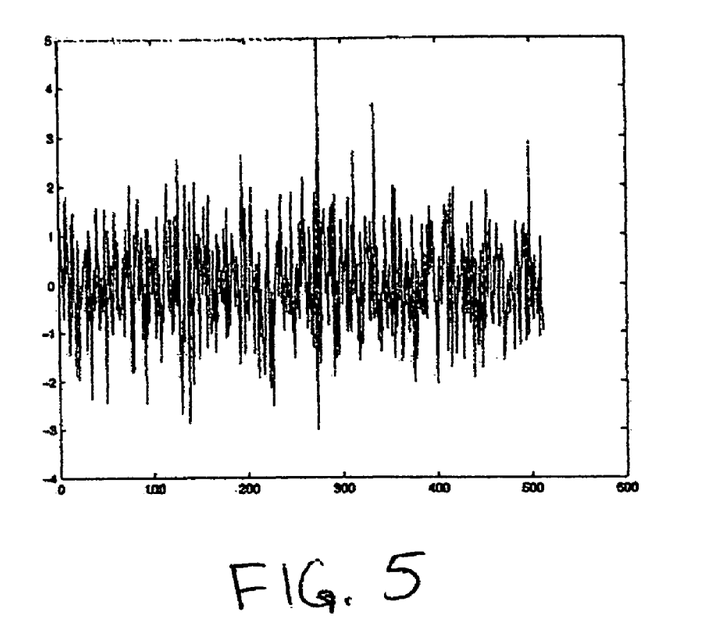
Figure 6:
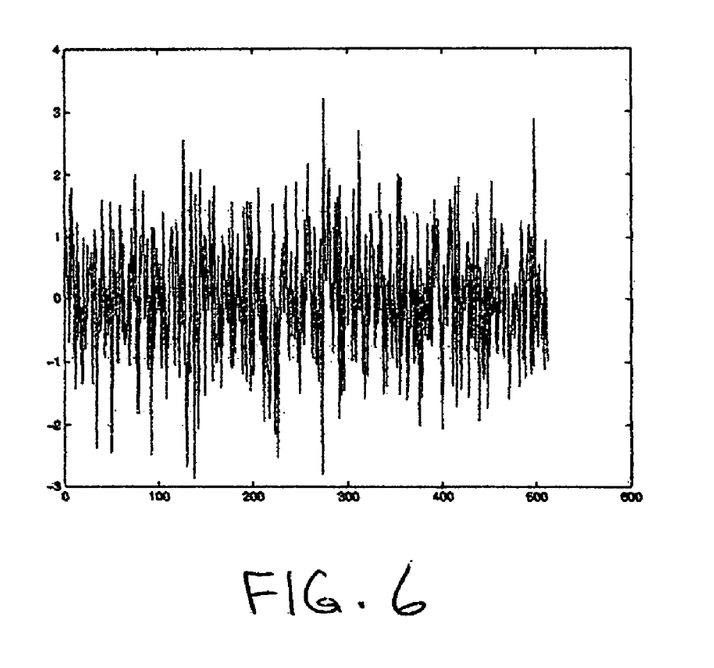
FIG. 6 illustrates graphically a noise-only signal from a different run.
Figure 7:
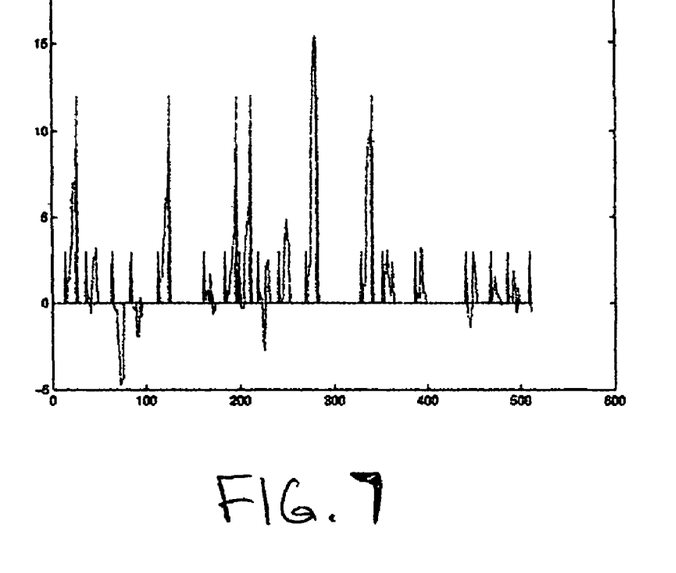
FIG. 7 illustrates graphically the Poisson points, and correlator and detector outputs from the signal of FIG. 5.

To test the noise behavior of the system, white noise with amplitude equal to the variance of the modulation key was added to the generated signal. This gives a peak s/n ratio of 1, which is about what might be expected from the noise fill-in approach; the average s/n ratio is, of course, much lower. The noisy signal is shown in FIG. 5; for comparison, a noise-only signal from a different run is shown in FIG. 6. The Poisson points, and correlator and detector outputs are shown in FIG. 7. Again, the message has been correctly decoded, despite the fact that it is very difficult to discern the data transmission by using the time trace.

Figure 8:
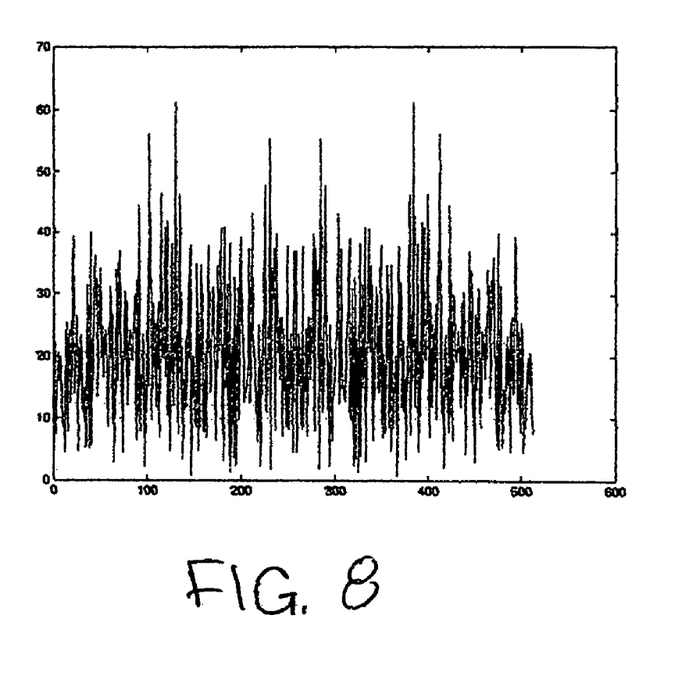
FIG. 8 illustrates graphically the FFT of the trace of FIG. 7.
Figure 9:
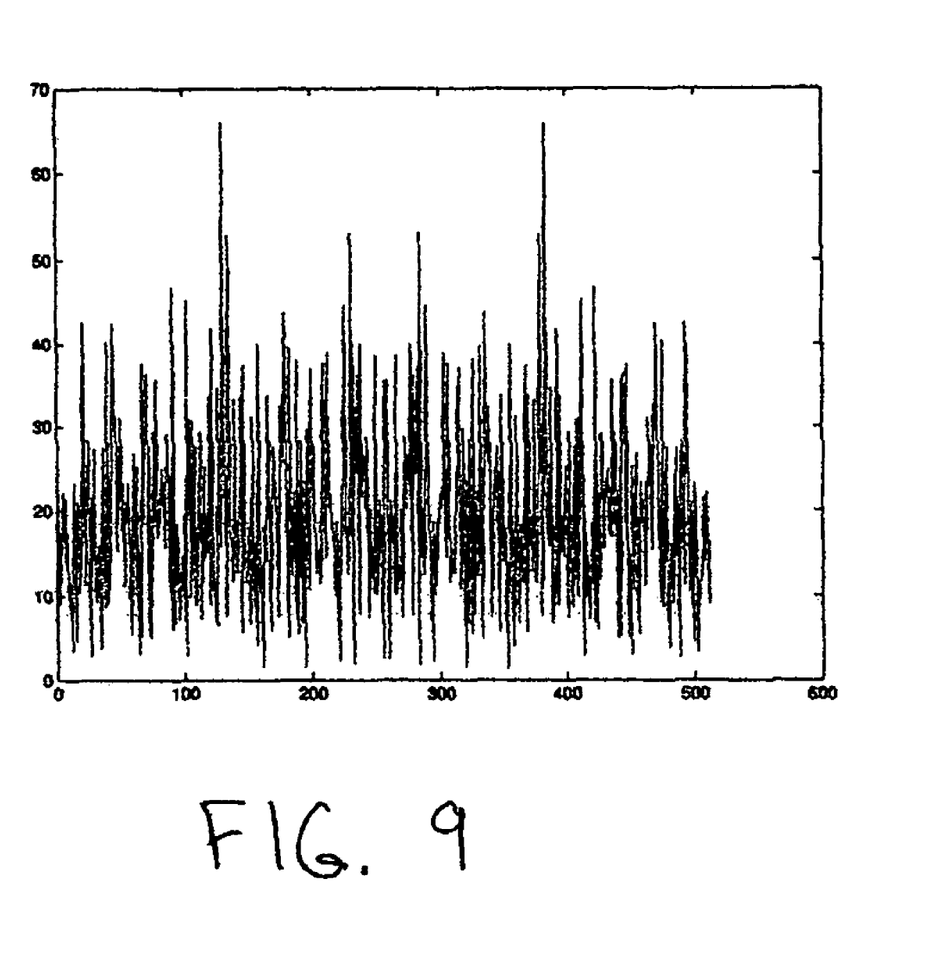
FIG. 9 illustrates graphically a comparison between FIG. 8 and an FFT of transmitted noise alone.

To check for frequency-domain differences, the FFT of the trace was taken and is shown in FIG. 8 and compared to the FFT of transmitted noise alone shown in FIG. 9. Again, there is very little visible indication of difference.

The above example has shown that it is possible for a transmitter to vary its modulation frequency (for example, to match local noise characteristics) and transmit information about this variation to the receiver together with its message. In the above example, it was assumed that the message and modulation were already encoded into a three-bit word. In another embodiment, the transmitter would perform this encoding. In addition, since the transmission is noisy, several runs showed bit errors, and so strong error-correction coding will be necessary. Error correction coding is well known in the art. Better bit-error-rate performance could also be achieved by using a coding vector longer than 10, but at the cost of increased power and detectability, or decreased information rate. In the worst case, if the modulation information is lost, a bi-directional communication may be needed to restore the connection so that uncorrupted data can be acknowledged and requests for retransmission can be sent. Since information as to the next packet will be lost when data is corrupted, a deterministic protocol, known to both the transmitter and receiver, can be used to vary the transmission until normal communications are restored. These issues, however, are well known in the art, and so the example has focused on the ability to track a priori unknown changes in the receiver modulation.

The information for the next transmission, such as frequency bands, modulation, and/or time for the next transmission is preferably contained in a header (alternatively referred to as overhead information). Since this information will raise the energy required to transmit the data, there will be a trade-off between the amount of surveillance information transmitted, the overhead information transmitted, and the energy radiated.

The methods of the present invention are particularly suited to be carried out by a computer software program, such computer software program preferably containing modules corresponding to the individual steps of the methods. Such software can of course be embodied in a computer-readable medium, such as an integrated chip or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for low-detectability communication between a transmitter and receiver, the method comprising acts of:
    (a) transmitting first data from the transmitter according to at least one of a first timing, modulation, and frequency;
    (b) appending the first data, prior to transmission, with information regarding at least one of a second timing, modulation, and frequency for a subsequent transmission; and
    (c) transmitting second data from the transmitter according to the information, wherein the at least one of the second timing, modulation, and frequency is changed from the first timing, modulation, and frequency by the information.

2. The method of claim 1, wherein the change comprises a random generation of the at least one of the first timing, modulation, and frequency.

3. The method of claim 1, wherein the information comprises a deviation in at least one of the first timing, modulation, and frequency.

4. The method of claim 1, wherein the information comprises at least one of the second timing, modulation, and frequency.

5. The method of claim 1, further comprising repeating steps (b) and (c) for subsequent data sets.

6. The method of claim 1, wherein for each subsequent transmission, the at least one of the second timing, modulation, and frequency is determined by the information from an immediately preceding first data.

7. The method of claim 1, wherein the first timing, modulation, and frequency is independent of the information.

8. The method of claim 1, wherein a given bit value of the first data and the second data is encoded as zero energy transmitted.

9. The method of claim 1, wherein the second modulation is changed from the first modulation by a parity of the first data.

10. The method of claim 1, wherein the information is contained in a header of the first data.

11. A transmitter for low-detectability communication with a receiver, the transmitter comprising:
    means for transmitting first data according to at least one of a first timing, modulation, and frequency;
    means for appending the first data, prior to transmission, with information regarding at least one of a second timing, modulation, and frequency for a subsequent transmission; and
    means for transmitting second data from the transmitter according to the information, wherein the at least one of the second timing, modulation, and frequency is changed from the first timing, modulation, and frequency by the information.

12. A receiver for receiving a low-detectability communication from a transmitter, the receiver comprising:
    means for receiving first data from the transmitter at one or more of a first timing, modulation, and frequency, the first data containing information regarding at least one of a second timing, modulation, and frequency for a subsequent transmission;
    means for reading the information in the first data; and
    means for receiving the second data from the transmitter according to the information, wherein the at least one of the second timing, modulation, and frequency is changed from the first timing, modulation, and frequency by the information.

13. A system for low-detectability communication, the system comprising:
    a transmitter comprising:
        means for transmitting first data from the transmitter according to at least one of a first timing, modulation, and frequency;

means for appending the first data, prior to transmission, with information regarding at least one of a second timing, modulation, and frequency for a subsequent transmission; and means for transmitting second data from the transmitter according to the information; and a receiver comprising:

means for receiving the first data from the transmitter;

means for reading the information in the first data; and means for receiving the second data from the transmitter according to the information, wherein the at least one of the second timing, modulation, and frequency is changed from the first timing, modulation, and frequency by the information.

14. A program storage device readable by a computer, tangibly embodying a program of instructions executable by the computer to perform method steps for low-detectability communication between a transmitter and receiver, the method comprising:

transmitting first data from the transmitter according to at least one of a first timing, modulation, and frequency;

appending the first data, prior to transmission, with information regarding at least one of a second timing, modulation, and frequency for a subsequent transmission; and transmitting second data from the transmitter according to the information, wherein the at least one of the second timing, modulation, and frequency is changed from the first timing, modulation, and frequency by the information.

15. A computer program product embodied in a computer-readable non-transitory medium for low-detectability communication between a transmitter and receiver executable by a computer, the computer program product comprising:

computer readable program code means for transmitting first data from the transmitter according to at least one of a first timing, modulation, and frequency;

computer readable program code means for appending the first data, prior to transmission, with information regarding at least one of a second timing, modulation, and frequency for a subsequent transmission; and computer readable program code means for transmitting second data from the transmitter according to the information, wherein the at least one of the second timing, modulation, and frequency is changed from the first timing, modulation, and frequency by the information.

\* \* \* \* \*